(12) United States Patent
Soulis

(10) Patent No.: US 6,324,000 B1
(45) Date of Patent: Nov. 27, 2001

(54) SEAM BETWEEN ADJACENT VISUALIZATION SCREENS

(75) Inventor: George N. Soulis, Waterloo (CA)

(73) Assignee: Fakespace Systems, Inc., Kichner (CA)

( * ) Notice: Subject to any disclaimer, the term of this patent is extended or adjusted under 35 U.S.C. 154(b) by 0 days.

(21) Appl. No.: 09/694,547

(22) Filed: Oct. 23, 2000

(51) Int. Cl.[7] .................................................. G03B 21/56
(52) U.S. Cl. .......................... 359/449; 359/443; 359/460
(58) Field of Search ................................... 359/449, 443, 359/451, 460

(56) References Cited

U.S. PATENT DOCUMENTS

| | | | |
|---|---|---|---|
| 970,913 | 9/1910 | Ganzini | 359/451 |
| 3,263,561 | 8/1966 | Jackson | 359/451 |
| 3,502,402 | 3/1970 | Markson | 352/69 |
| 3,682,527 | 8/1972 | Pirelli et al. | 359/449 |
| 4,641,918 | 2/1987 | Moffatt et al. | 359/451 |
| 4,984,871 | * 1/1991 | Martinez | 359/443 |
| 4,991,955 | * 2/1991 | Vetter | 352/69 |
| 5,103,339 | 4/1992 | Broome | 359/443 |
| 5,130,846 | 7/1992 | Kowalchuk et al. | 359/443 |
| 5,206,760 | 4/1993 | Nakashima et al. | 359/457 |
| 5,400,178 | 3/1995 | Yamada et al. | 359/449 |
| 5,414,558 | 5/1995 | You | 359/451 |
| 5,673,145 | 9/1997 | Wilson | 359/449 |
| 5,949,576 | 9/1999 | Wilson | 359/449 |

* cited by examiner

Primary Examiner—Christopher Mahoney
Assistant Examiner—Magda Cruz
(74) Attorney, Agent, or Firm—Harness, Dickey & Pierce, P.L.C.

(57) ABSTRACT

A rear projection screen assembly where adjacent screens are joined with the position of one screen being slightly offset and behind the other screen so that the visual discontinuity between the screens is reduced.

28 Claims, 5 Drawing Sheets

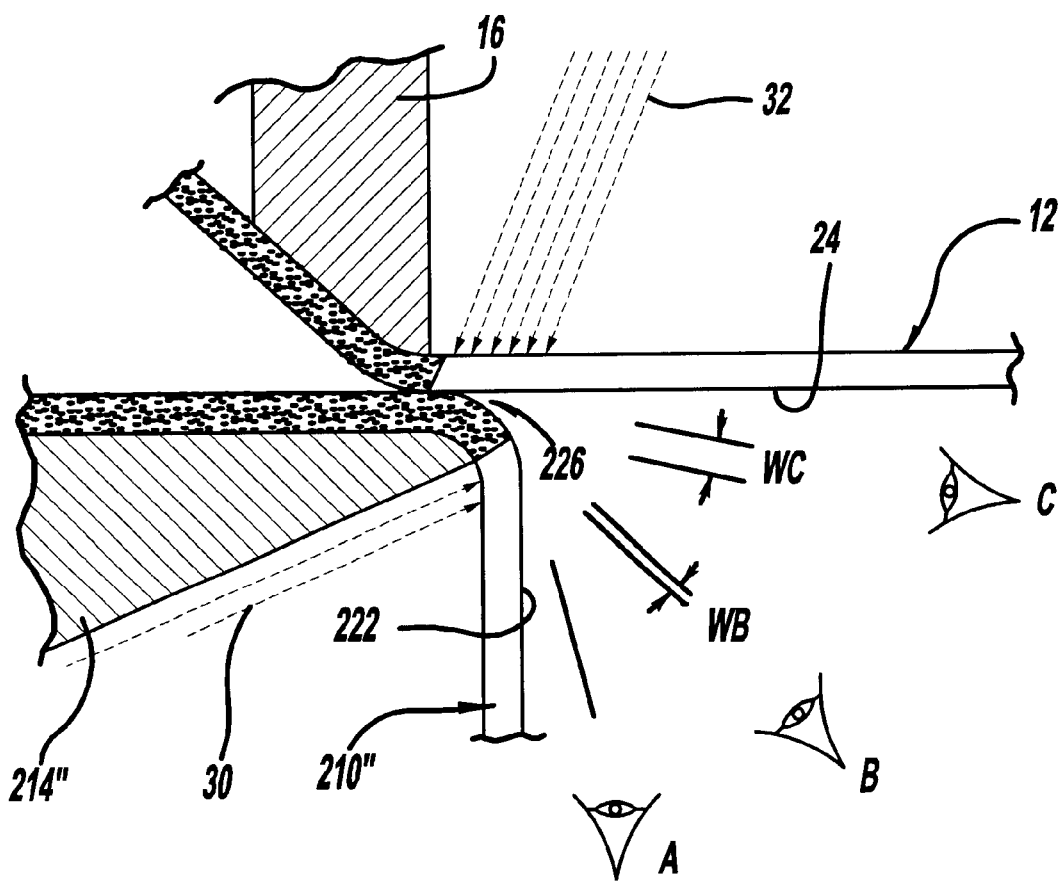
_Figure - 4_

SEAM BETWEEN ADJACENT VISUALIZATION SCREENS

BACKGROUND OF THE INVENTION

1. Field of the Invention

The present invention relates to rear projection visualization systems and in particular to a construction which minimizes the visual seam between adjacent screens of a rear projection visualization system.

2. Description of the Prior Art

In numerous industries, rear projection visualization systems have become important visualization and design tools. In such systems, the image is projected from the rear side of a translucent screen, relative to the location of the viewer. This allows the viewer to move as needed in front of the screen without interfering with the projected image and without interfering with the viewer's perception of the projected image. In some situations, more than one screen may be used to display a large melded image because such a single screen would be too large to manufacture in one piece. Other applications, such as screens for more immersive virtual reality systems, require multiple adjacent screens as the images are melded together from multiple projectors to create the desired effects. These systems exhibit enhanced immersiveness when the screens are at angles relative to one another, completely or partially surrounding the viewer.

When melded multiple images are back projected onto two adjacent screens, particularly when those screens are at angles relative to one another, a dark, finite width, "visual seam" is created between the two screens. The darkness in the visual seam is caused by the frames supporting the screens. These frames prevent light, from the projectors, from reaching into the space where the screens meet. The melded images which cross over the two screens are thus interrupted by a dark visual seam which runs the height of the screens. In some constructions, the ends of the screens are bent or radiused around the frames and the frames prevent projected light from entering into these radiuses.

Generally illustrative prior art systems include U.S. Pat. Nos. 5,103,339; 5,400,178; and 5,206,760.

A multi-panel framing system is disclosed in U.S. Pat. No. 5,103,339. The edges of the screens are compressed and fastened between brackets in the front and rear of the screens. While holding the multiple screens securely together, portions of the brackets are visible in the front of the screens leaving a visual seam between the screens.

An alternative approach to join multiple screens and minimize the visual seam is disclosed in U.S. Pat. No. 5,400,178. Here multiple screen panels are adjoined in a lattice framework where the square lattice of screens is installed in an outer frame. While the disclosed structure may minimize the visual seam, it can only be used for a uniformly flat screen. Some applications, such as those for virtual reality systems, require adjacent screens to be angled at less than 180° from each other.

A further alternative approach is disclosed in U.S. Pat. No. 5,206,760 where multiple screens are adjoined with a transparent bracket. The bracket is H-shaped and decreases the missing information in the dark visual seam area by using the bracket as a lens. Similarly to U. S. Pat. No. 5,400,178 described above, this approach can also only be used with screens angled 180° next to each other.

In view of the foregoing limitations and shortcomings of the prior art devices, as well as other disadvantages not specifically mentioned above, it should be apparent that there still exists a need in the art for a construction that minimizes the visual seam between adjacent screens.

It is therefore a primary object of this invention to fulfill that need by providing a construction which reduces the average perceived width of the visual seam between two screens which are at an angle less than 180° relative to each other and to have the visual seam illuminated by channeling light from the projector through a translucent material into the seam.

SUMMARY OF THE INVENTION

Briefly described, these and other objects are accomplished allowing the present invention to provide a multi-screen rear projection visualization system in which the screens are attached to each other in such a way as to reduce the average width of the visual seam.

To achieve the desired results, two screens (supported by frames) are oriented between 0° and 180°, relative to one another, and one of the screens is positioned so as to be offset and in front of the other screen at the location where edges of the screens are adjacent. The offset position of the screens allows the illuminated portion of the forward screen to be visible to the viewer while at least partially obscuring the non-illuminated portion of the other. As a result, the average width of the dark visual seam as seen from all viewing angles is reduced.

In an alternative embodiment, one or both of the frames could be made of a transparent material and formed with a step in the frame which would further permit illumination of portions of the screen immediately adjacent the frame. In a further embodiment, reflective material is secured to the frame, ahead of the step, redirecting additional light into the corner of the adjacent screens.

Accordingly, one aspect the invention is a screen assembly for a rear projection visualization system comprising, a first screen including a translucent sheet supported along a left upright edge by a first frame member, a second screen including a translucent sheet supported along a right upright edge by a second frame member, said first and second screens being adjacent to one another and defining an angle therebetween of less than 180°. The left upright edge of the first screen and the right upright edge of the second screen defining a corner, one of said left and right upright edges being located in an offset position relative to the other of the left and right edges whereby the offset position reduces an average width of a visual seam in the corner when compared with the left and right upright edges being in a non-offset position.

In another aspect, the invention is an improvement in a rear projection visualization system including a computer system for generating image signals coupled to a plurality of projections respectively positioned to back project images onto a plurality of screens. The improvement comprises the screens being adjacent to and defining a corner angle therebetween of less than 180°, a first one of said screens being located in an offset position in front of a front side of a second one of said screens whereby an average width of a visual seam perceivable in a corner between said screens is reduced.

Additional benefits and advantages of the present invention will become apparent to those skilled in the art to which the present invention relates from the subsequent description of the preferred embodiments and the appended claims, taken in conjunction with the accompanying drawings.

BRIEF DESCRIPTION OF THE DRAWINGS

FIG. 4 is a sectional view illustrating an alternative embodiment of the present invention;

DETAILED DESCRIPTION OF THE PREFERRED EMBODIMENT

Figure 1:
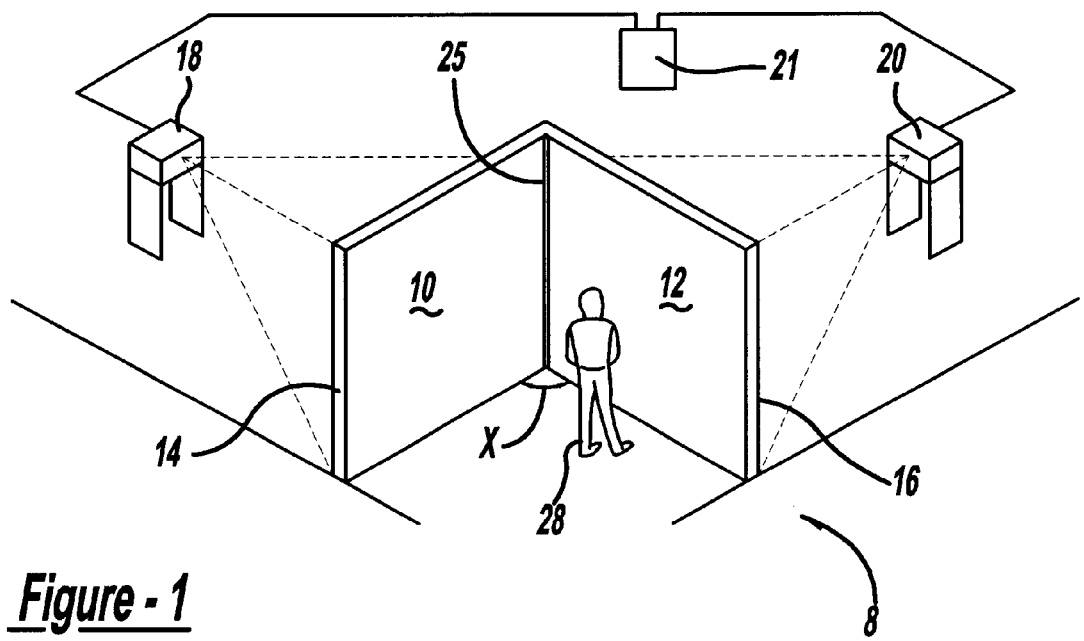
FIG. 1 is perspective view of the rear projection visualization system of the present invention.

Referring now in detail to the drawings, there is shown in FIG. 1 a perspective view of the rear projection visualization system 8 according to the principles of the present invention. The visualization system 8 includes at least two screens 10, 12 and two projectors 18, 20.

The screens 10, 12 are a type well known in the industry such that projected images may be received on the rear of the screens 10, 12 and viewed on the respective front sides 22, 24 of the screens 10, 12 by viewer 28. Representative screens are translucent and flexible and one such variety of screen is the Cineplex screen by Draper of Spiceland, Ind., USA. Obviously, other suitable screens may be used as well. The images are projected by projectors 18, 20 located behind the screens 10, 12. The projectors 18, 20 are of a variety known in the industry, such as the Marquee projector by Christie Digital Systems of Ontario, Canada. Obviously, other suitable projectors may be used as well.

The projectors 18, 20 are connected to an appropriate computer system 21 for the generation of images. The specifics of such a computer system are beyond the scope of the present discussion, but those skilled in the industry will appreciate the requirements of the computer system and that the requirements are dependent upon the specific application of the present system 8.

The screens 10, 12 are positioned adjacent to each other to enable melding of the projected images together on the front sides 22, 24 of the screens 10, 12. A frame 14, 16 supports or encases each screen 10, 12 and along with other support structures (not shown) orients the screens 10, 12 at an angle X relative to one another. The angle X can range from greater than 0° to less than 180°. Make up of the frames 14, 16 includes metal (e.g. aluminum) or plastic rail members (extruded or machined) or wood extending about at least a portion of the perimeter of the screens 10, 12. The screens 10, 12 are mounted thereto in a conventional manner by batts, rivets, snaps, or other fasteners, clamps, lacing or other suitable mechanisms or means. To support the frames 14, 16 and screens 10, 12 in an upright manner, appropriate legs, stanchions or supports are attached to or used with the frames 14, 16. These features are not shown in the figures for the sake of clarity, it being understood that those skilled in the art will readily appreciate such structures.

Figure 2:
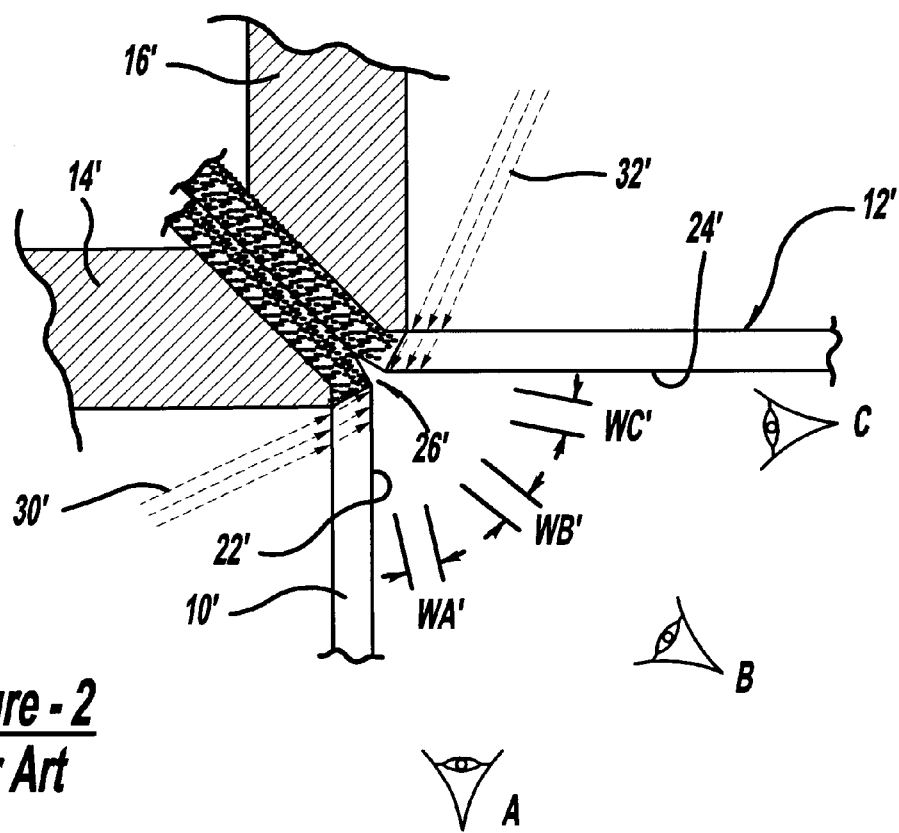
FIG. 2 is a sectional view through a corner of adjacent screens according to the prior art.

As mentioned above, when melded multiple images are projected through to the front sides 24', 26' of two adjacent screens 10', 12', located at angles relative to one another, a visual seam is created between the two screens 10', 12'. The visual seam, identified as element 26' in FIG. 2, is perceived by the viewer 28, in the corner 25 where screens meet, as a dark line of finite width extending the height of the screens 10', 12'. The darkness of the visual seam 26 is caused by portions of the frame 14', 16', at the location of the visual seam 26, preventing light from the projectors from being projected completely into the corner 25 or the space where the screens 10', 12' meet.

The construction specifically illustrated in FIG. 2 is one where the ends of the screens 10', 12' are radiused around frames 14', 16'. As seen herein, the light paths 30' and 32' from the projectors illuminate those portions of the screens 10', 12' which are not blocked by the frames 14', 16'. Those portions of the screens 10', 12' which are blocked by the frames 14', 16' are illustrated with stippling as being darkened. As seen in this figure, the non-illuminated portion of the screens 10', 12' extends into the radius where the screens 10', 12' curl or bend around the frames 14', 16'. As a result, the visual seam 26 will have a finite width (identified as WA', WB', WC') when viewed by a viewer 28 from any of the viewing positions A, B or C, as well as an average overall width which may be based on the above viewing positions or a different set of viewing positions.

Figure 3:
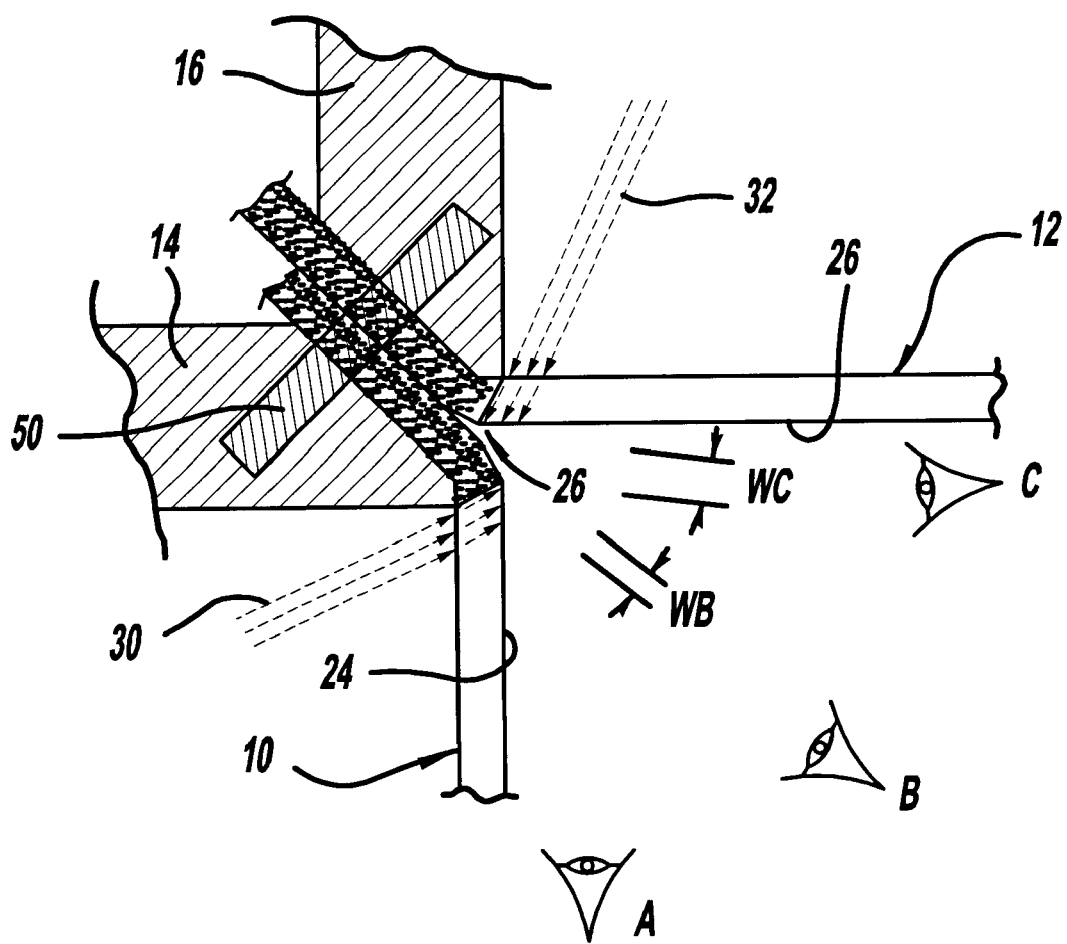
FIG. 3 is a sectional view through a corner of adjacent screens in the rear projection visualization system of the present invention.

Referring now to FIG. 3, the present invention proposes a novel construction which decreases or minimizes the visual perception of the visual seam 26. FIG. 3 is a cross sectional view through the corner 25 defined by the adjacent screens 10, 12. In the present invention, the frame 14 retaining screen 10 is offset slightly and in front of the frame 16 retaining screen 12. This is demonstrated in FIG. 3 by the positioning of frame 14 and screen 10, relative to frame 16 and screen 12, more closely toward the viewer 28. As a result, when viewed from position A, an acute angle relative to the screen 10, the visual seam 26 is substantially imperceptible. When viewed from position B, the width WB of the visual seam is reduced as compared to that in FIG. 2. Another way of stating this is that the radius (formed as the screen 10 bends around the frame 14) is located in front of the radius formed by the screen 12 as it bends around its respective frame 16 (the term "in front of" meaning close to the viewer). As a result, the average width of the visual seam 26 is reduced.

An alternative embodiment of the present invention is shown in FIG. 4. In this embodiment, screen 210 is offset and in front of screen 12. Screen 210 is also shown as being radiused around its frame, frame 214, at approximately a 90° angle, with the frame 214 generally defining approximately a 35° angle with respect thereto. This allows the offset of the screen 214" to be in the form of the screen 210" being moved laterally in front of screen 12, instead of diagonally in front (as in the prior embodiment). As with the prior embodiment, when the front sides 222 and 24 are viewed from positions A, B, and C, perception of the visual seam 226 is decreased or minimized in positions A and B and the average width of the visual seam 226 is reduced.

Figure 5:
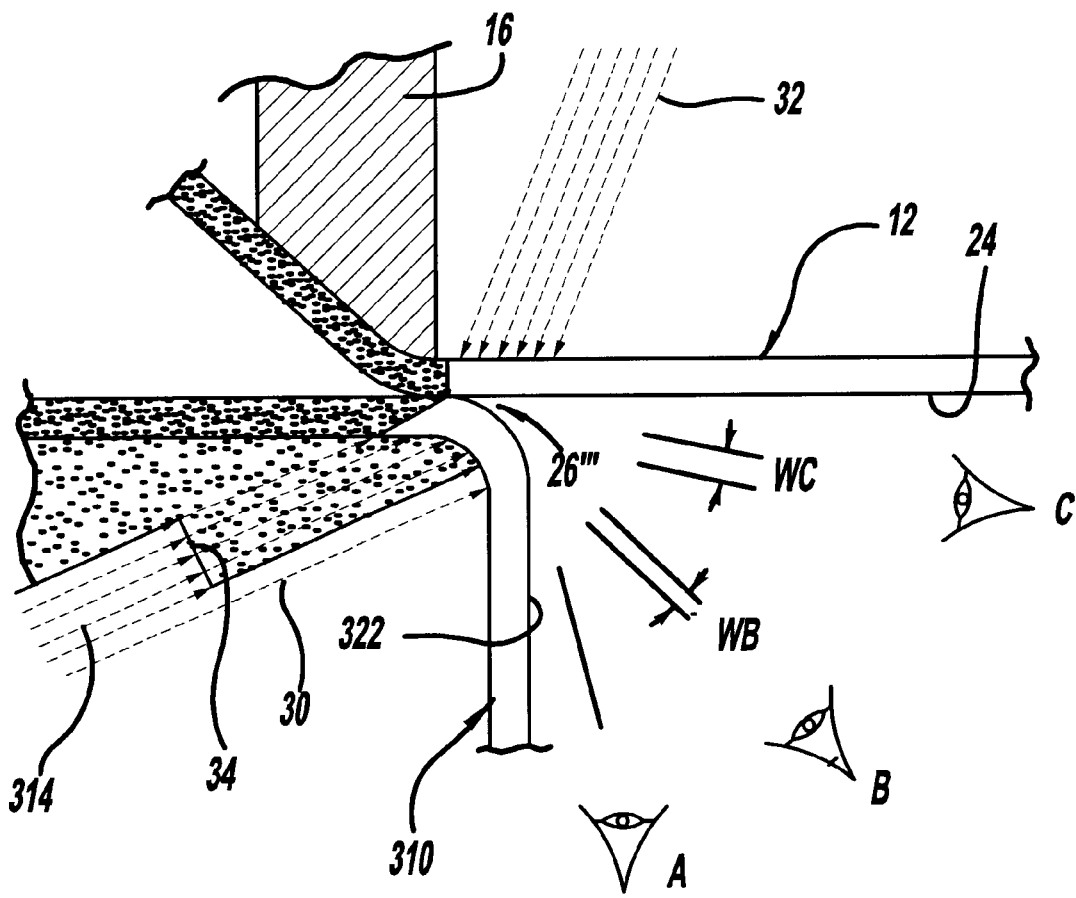
FIG. 5 is a sectional view like FIG. 4 illustrating a further alternative embodiment of the present invention.

In the further embodiment of FIG. 5, the perception of the visual seam 326 is even further reduced. The construction as illustrated in FIG. 5 is substantially similar to that of FIG. 4 except that the frame 314 is formed with a step 34 generally perpendicular to the path of travel for the light 30 from the projector 18 and this portion of the frame 314 is transparent. By making this portion of the frame 314 or all of the frame 314 transparent, the light from the projector 18 projects through frame 314 and then deeply into the radius or curved part of the screen 310 thereby illuminating that portion of the screen behind or at the step 34. When seen from the front sides 322 and 24, the visual seam 26''' and its average width are even further minimized or reduced.

Figure 6:
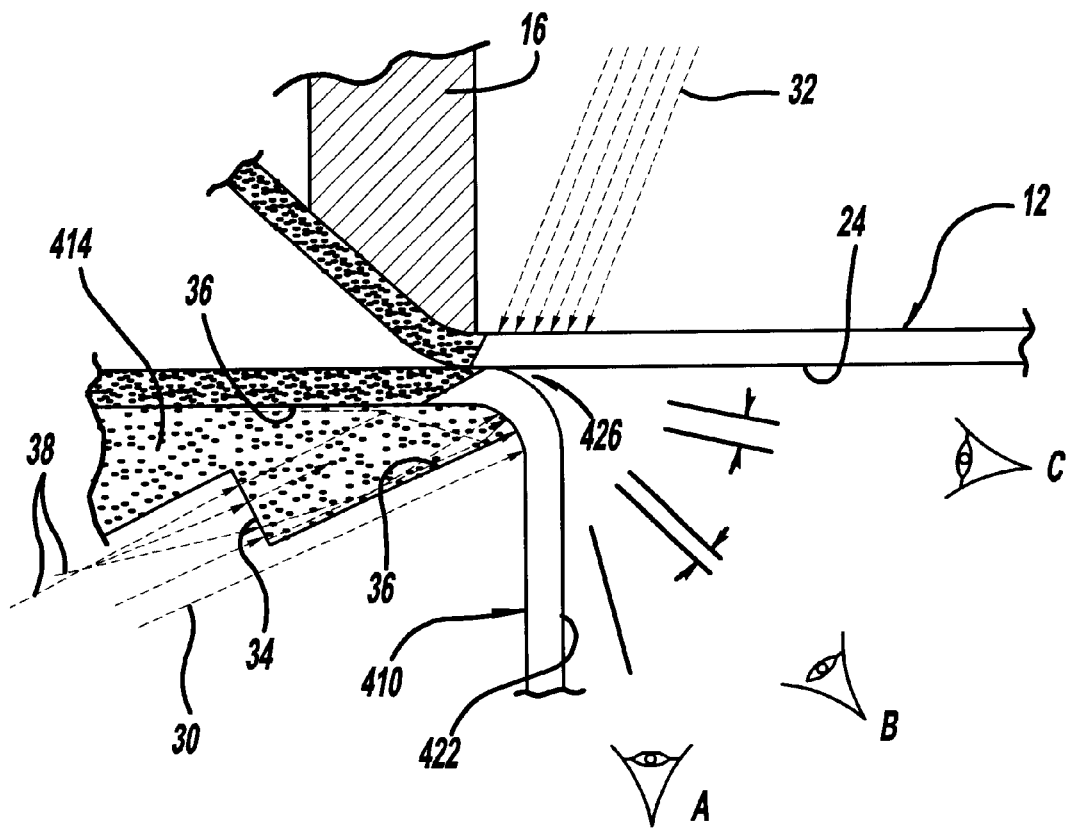
FIG. 6 is a sectional view similar to FIG. 5 illustrating yet another alternative embodiment of the present invention.

In the final embodiment of FIG. 6, a reflective coating 36 is provided, at least partially, on the sides of the frame 414 ahead of the step 34. As a result, light rays 38 not perpendicular to the face of the step 34 are reflected into the corner brightening the visual seam 426. The reflective coating 36 may include a material such as aluminum paint, silver deposit or reflective tape, which is either sprayed or otherwise applied or adhered to the respective portions of the frame 414.

With one of the screens 10, 210, 310, and 410 offset relative to the other screen 12, the two screens are secured in their relative positions, either to other supports or each other, by fasteners or other appropriate means. For example, a threaded fastener 50 (e.g. a bolt), as seen in FIG. 3, may be inserted through one or both frames and engage the other frame or a corresponding threaded retainer (e.g. a nut).

While the above description constitutes the preferred embodiments of the present invention, it will be appreciated that the invention is susceptible to modification, variation and change without departing from the proper scope and fair meaning of the accompanying claims.

What is claimed is:

1. A screen assembly for a rear projection visualization system comprising:
    a first screen including a translucent sheet supported along a left upright edge by a first frame member;
    a second screen including a translucent sheet supported along a right upright edge by a second frame member;
    said first and second screens being adjacent to one another and defining an angle therebetween of less than 180° with said left upright edge of said first screen and said right upright edge of said second screen defining a corner, one of said left and right upright edges being located in an offset position relative to the other of said left and right edges whereby said offset position reduces an average width of a visual seam in said corner when compared with said left and right upright edges being in a non-offset position.

2. The assembly of claim 1 wherein said offset position includes said one of said left and right upright edges being positioned in front of the other of said left and right upright edges.

3. The assembly of claim 1 wherein said offset position includes said one of said left and right upright edges being positioned diagonally in front of the other of said left and right upright edges.

4. The assembly of claim 1 wherein said offset position includes said one of said left and right upright edges being positioned laterally in front of the other of said left and right upright edges.

5. The assembly of claim 1 wherein said sheet of said first screen bends around said first frame member forming a first curved position, said first frame member blocking light from projecting completely into said first curved portion and wherein said sheet of said second screen bends around said second frame member forming a second curved portion, said second frame member blocking light from projecting completely into said second curved portion.

6. The assembly of claim 5 wherein said first and second curved portions have equal radii of curvature.

7. The assembly of claim 5 wherein said first and second curved portions have unequal radii of curvature.

8. The assembly of claim 5 wherein of at least a portion of one of said first and second frame members is light transmitting.

9. The assembly of claim 8 wherein said portion member includes a step formed therein.

10. The assembly of claim 9 wherein said step is generally planar.

11. The assembly of claim 10 wherein said step is oriented with respect to said sheet at an included angle of greater than 35°.

12. The assembly of claim 9 wherein said portion is transparent.

13. The assembly of claim 12 wherein said portion which is transparent includes side surfaces of reflective material channeling light not perpendicular to said step toward said curved portion.

14. The assembly of claim 8 wherein said portion is transparent.

15. A rear projection visualization system including a computer system for generating image signals coupled to a plurality of projections respectively positioned to back project images onto a plurality of screens, the improvement comprising said screens being adjacent and defining a corner angle therebetween of less than 180°, a first one of said screens being located in an offset position in front of a front side of a second one of said screens whereby an average width of a visual seam perceivable in a corner between said screens is reduced.

16. The improvement of claim 15 wherein said first one of said screens includes a sheet bent around said first frame member forming a first curved position, said first frame member blocking light from projecting completely into said first curved portion and wherein said second one of said screens includes a sheet bent around a second frame member forming a second curved portion, said second frame member blocking light from projecting completely into said second curved portion.

17. The improvement of claim 15 wherein said first and second curved portions have equal radii of curvature.

18. The improvement of claim 15 wherein said first and second curved portions have unequal radii of curvature.

19. The improvement of claim 15 wherein of at least a portion of one of said first and second frame members is light transmitting.

20. The improvement of claim 19 wherein said portion member includes a step formed therein.

21. The improvement of claim 20 wherein said step is generally planar.

22. The improvement of claim 21 wherein said step is oriented with respect to said sheet at an included angle of greater than 35°.

23. The improvement of claim 21 wherein said portion is transparent.

24. The improvement of claim 20 wherein said portion is transparent.

25. The improvement of claim 24 wherein said portion which is transparent includes side surfaces of reflective material channeling light not perpendicular to said step toward said curved portion.

26. The improvement of claim 15 wherein said offset position includes an upright edge of one of said screens being positioned in front of an upright edge of the other of said screens.

27. The improvement of claim 26 wherein said offset position includes said one of said upright edges being positioned diagonally in front of the other of said left and right upright edges.

28. The improvement of claim 26 wherein said offset position includes said one of said upright edges being positioned laterally in front of the other of said upright edges.

* * * * *